United States Patent [19]
Saitou

[11] Patent Number: 4,773,425
[45] Date of Patent: Sep. 27, 1988

[54] ULTRASONIC IMAGING APPARATUS

[75] Inventor: Satoshi Saitou, Ootawara, Japan

[73] Assignee: Kabushiki Kaisha Toshiba, Kawasaki, Japan

[21] Appl. No.: 852,793

[22] Filed: Apr. 16, 1986

[30] Foreign Application Priority Data

Apr. 17, 1985 [JP] Japan .................................. 60-80238

[51] Int. Cl.⁴ ............................................. A61B 10/00
[52] U.S. Cl. ................................. 128/660.04; 358/112
[58] Field of Search ................................ 128/660–661; 73/620, 626; 340/724, 728, 799–801; 358/112

[56] References Cited

U.S. PATENT DOCUMENTS

| 4,206,654 | 6/1980 | Keller et al. | 128/660 X |
| 4,241,608 | 12/1980 | Dees et al. | 128/660 X |
| 4,398,540 | 8/1983 | Takemura et al. | 128/660 |
| 4,520,671 | 6/1985 | Hardin | 128/660 X |

OTHER PUBLICATIONS

Hoshino, H. et al., "Microprogrammable Ultrasonic Image Processor and Its Applications to Image Manipulation", SPIE, vol. 314, Digital Radiog., (1981).

Primary Examiner—Francis J. Jaworski
Attorney, Agent, or Firm—Finnegan, Henderson, Farabow, Garrett and Dunner

[57] ABSTRACT

An ultrasonic imaging apparatus includes a first display screen for displaying a standard size tomographic image derived from echo waves from an object to be examined, a region designating section for designating a desired region of the tomographic image displayed on the first display screen, a zooming processor for converting a tomographic image signal corresponding to the region designated by the region designating section to an enlarged image signal, and a second display screen for displaying as an enlarged image the enlarged image signal supplied from the zooming processor.

11 Claims, 3 Drawing Sheets

4,773,425

ULTRASONIC IMAGING APPARATUS

BACKGROUND OF THE INVENTION

The present invention relates to an ultrasonic imaging apparatus for emitting an ultrasonic wave to an object to be examined and displaying echo signals reflected by the object as a tomographic image.

In a conventional ultrasonic imaging apparatus, a tomogram of the object can be displayed on a TV monitor in a range 50- to 100-mm wide and 200-mm deep, and can be enlarged up to 1.3 times.

However, the tomographic image displayed on the TV monitor cannot be properly observed with the conventional apparatus since a specific object portion (e.g., diseased portion) is often too small to observe accurately. For example, if a 2- to 3-mm portion of the object is to be observed on the TV monitor, it cannot be accurately discriminated, depending on a given resolution of the monitor. In this case, the portion can be enlarged for better diagnosis, even in the conventional apparatus. However, the magnification is predetermined, and the field of view is limited. In addition, when the portion is enlarged, the standard size tomographic image disappears from the screen and the position of the enlarged image is deviated from that in the standard size image. As a result, an operator or doctor cannot perform proper diagnosis.

SUMMARY OF THE INVENTION

It is an object of the present invention to provide an ultrasonic imaging apparatus for enlarging any region of a standard size tomographic image, with any magnification, and displaying the standard size tomographic image and the enlarged image or region.

According to the present invention, an ultrasonic imaging apparatus comprises a first display screen for displaying a standard size tomographic image derived from echo waves from an object under examination, a region designating section for designating a desired region of the tomographic image displayed on the first display screen, a zooming processor for converting a tomographic image signal corresponding to the region designated by the region designating section to an enlarged image signal, and a second display screen for displaying an enlarged image in response to the enlarged image signal supplied from the zooming processor.

DETAILED DESCRIPTION OF THE PREFERRED EMBODIMENT

Figure 1:
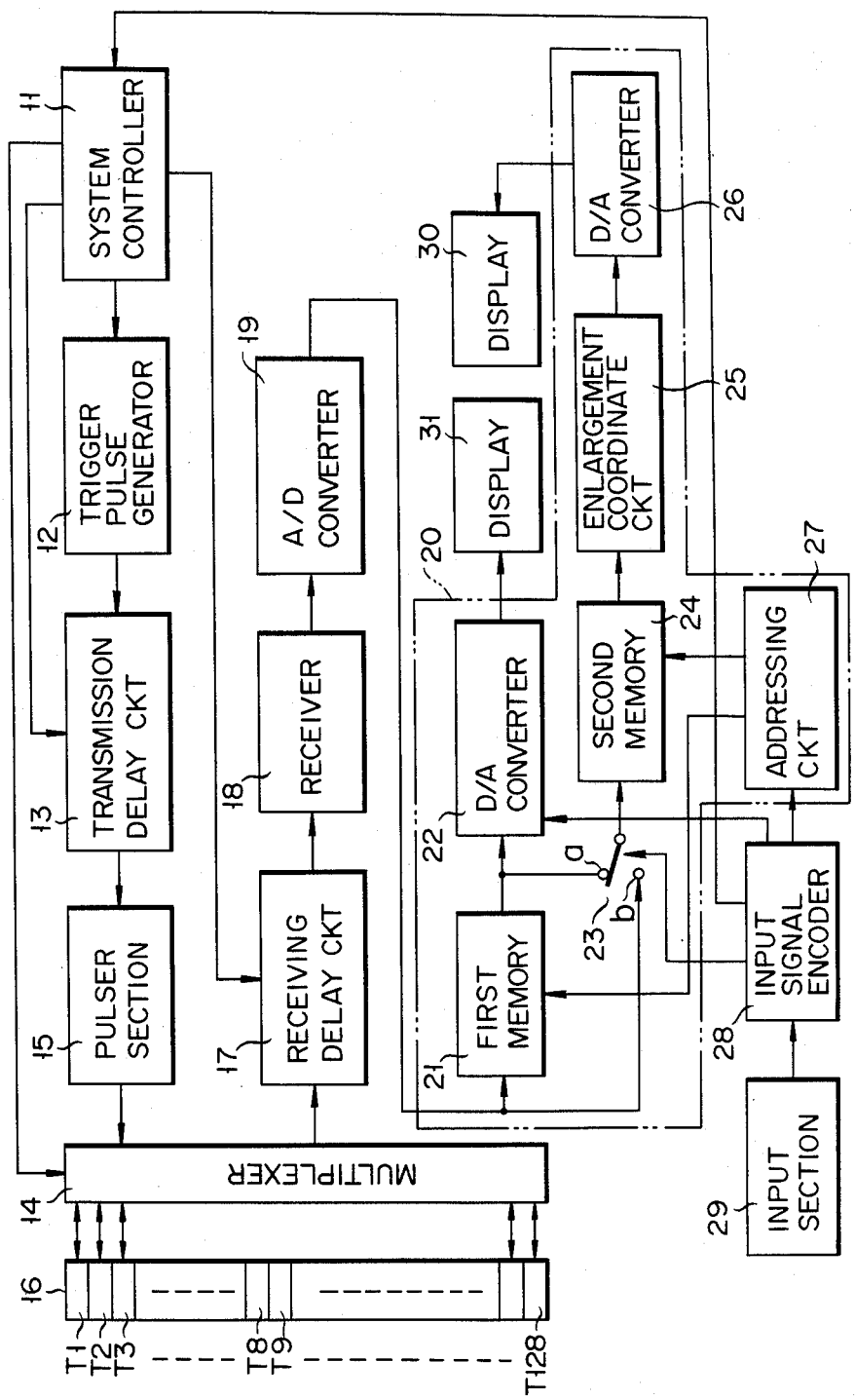
FIG. 1 is a block circuit diagram of an ultrasonic imaging apparatus according to an embodiment of the present invention.

In an ultrasonic imaging apparatus shown in FIG. 1, system controller 11 includes a ROM for storing a program for displaying a standard size image, and another ROM for storing a program for displaying an enlarged image. Controller 11 outputs control signals according to these programs.

The output terminals of controller 11 are connected to trigger pulse generator 12, transmission delay circuit 13, and multiplexer 14. Generator 12 outputs transmission pulses. The output terminal of generator 12 is connected to circuit 13. Circuit 13 delays the output pulses from generator 12 in accordance with scanning, aperture and focusing conditions. The output terminal of circuit 13 is connected to pulser section 15. Section 15 converts the delayed pulses to high level drive pulses for driving transducer elements in ultrasonic transducer 16. The output terminal of section 15 is connected to multiplexer 14. Multiplexer 14 has a switching function for selectively supplying the drive pulses from section 15 to the transducer elements in the ultrasonic transducer 16, and for guiding echo signals from transducer 16 to receiving delay circuit 17. Multiplexer 14 decides the number of the transducer elements to be driven as one group.

Circuit 17 has delay functions corresponding to the delay times of circuit 13. The output terminal of circuit 17 is connected to receiver 18. Receiver 18 adds and amplifies the echo signals. The output terminal of receiver 18 is connected to first memory 21 in zooming circuit section 20 and to contact b of switch 23 through A/D converter 19. The output terminal of first memory 21 is connected to D/A converter 22 through contact a of switch 23. Common contact c of switch 23 is connected to second memory 24. Memory 24 stores image data of memory 21 which correspondes to a region to be enlarged. Image data is supplied from memory 24 to enlargement coordinate circuit 25. Memories 21 and 24 are accessed by address data from addressing circuit 27. Circuit 27 determines address in response to input data from input section (for example, keyboard) 29, through input signal encoder 28.

Circuit 25 has a function for converting coordinate data of the standard size image to enlarged image coordinate data so as to convert the image data in memory 24 to enlarged image data. The output terminal of circuit 25 is connected to D/A converter 26. Converter 26 is connected to enlarged image display 30, while converter 22 is connected to standard size image display 31.

In the ultrasonic imaging apparatus having the arrangement described above, when the standard size image display mode is set at section 29, controller 11 executes the standard size display program. More specifically, controller 11 energizes generator 12 which then supplies, e.g., eight ultrasonic pulses for driving eight ultrasonic transducers to delay circuit 13. Circuit 13 delays the output pulse signals from generator 12 by delay time required for focusing the ultrasonic beams. When circuit 13 supplies the delayed pulse signals to pulser section 15, the eight drive pulses are supplied from pulser section 15 to multiplexer 14. Multiplexer 14 supplies the drive pulses to, e.g., ultrasonic transducers T1 to T8 in response to switching signals from controller 11. Transducers T1 to T8 are driven by the respective drive pulses and are emitted into an object to be examined (not shown).

Echo waves from the object are converted by the ultrasonic transducer elements in transducer 16 to echo signals. In this case, multiplexer 14 supplies the echo signals from transducer elements T1 to T8 to delay circuit 17. Receiving delay circuit 17 delays the echo signals by delay times corresponding to those of transmission delay circuit 13, and the delayed echo signals are supplied to receiver 18. Receiver 18 adds and amplifies the echo signals and generates the amplified echo signals as an image signal. The image signal is converted by A/D converter 19 to digital image data. The digital image data is stored in memory 21. Image data is read out from memory 21 and converted by converter 22 to an analog video signal. The analog video signal is supplied to display 31 and displayed as a one-scanning line image thereon.

When multiplexer 14 supplies the drive pulses to transducer elements T2 to T9 in response to the switching signal from controller 11, a second scanning line image data is stored in memory 21 and is then displayed on display 31. Thus, image data for 120 scanning lines is stored in memory 21 and displayed as a standard size tomographic image on display 31.

When a desired region of the tomographic image displayed on display 31 is to be enlarged, the operator sets the enlargement mode at input section 29. The enlargement mode is performed in accordance with the flow chart in FIG. 2. In this mode, as shown in FIG. 3, zooming frame ZF is displayed on the upper left corner of display 31. Center coordinate position P1 of frame ZF is predetermined. When position P1 is shifted to desired position P2 upon operation of a cursor member in input section 29, shifting is detected as a voltage change. Frame ZF is enlarged to frame ZF' by slider members arranged in input section 29. Frame ZF' is defined by coordinates X1, X2, Y1, and Y2. In this state, a change in the size of zooming frame ZF is detected as a voltage change. In other words, upon operation of its slider members (potentiometers), input section 29 generates voltages V1 and V2 corresponding to positions of the slider members. Voltages V1 and V2 are converted by encoder 28 to coordinate data X1 and X2. Similarly, input section 29 generates voltages V3 and V4 corresponding to positions of the slider members with respect to direction Y of depth. Voltages V3 and V4 are then converted by encoder 28 to coordinate data Y1 and Y2.

When coordinates X1, X2, Y1, and Y2 are determined as described above, the number of ultrasonic transducer elements (i.e., the number of channels) driven as one group, that is, an aperture size in proportion to the depth of enlarged region ZF' is determined in accordance with the calculation of (Y1+Y2)/2. Therefore, the number of channels is determined as follows:

| (Y1 + Y2)/2 | Number of Channels |
| --- | --- |
| 0–30 | 8 |
| 30 over - 60 | 12 |
| 60 over - 120 | 16 |
| 120 over - 200 | 24 |

Figure 4:
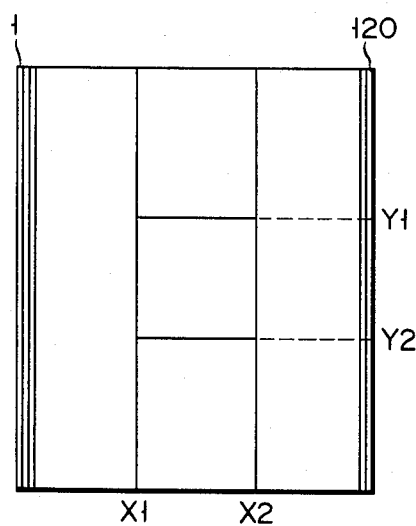
FIG. 4 is a plan view showing a first frame screen.

Coordinates X1 and X2 are converted to addresses of memory 24. For the sake of simplicity, the memory addresses are represented by X1 and X2, which also represent the above coordinates. Address calculations are performed by X2−X1. If (X2−X1)≧½×128, the fixed channel routine is executed. In this routine, the transducer elements corresponding to the predetermined number of channels are driven as one group. At the same time, controller 11 outputs control signals for supplying the drive pulses to transducer 16 so as to linearly scan a distance between coordinates X1 and X2. In other words, if one frame is constructed of 120 scanning lines, as shown in FIG. 4, and (Y1+Y2)/2 is given as 30 over−60, the number of transducers, i.e., the number of channels for obtaining one scanning line is 12. Since 12 channels are driven, the central channel is the 6th channel. For example, if transducers T1 to T12 are to be driven, the central channel is 6th transducer T6. Therefore, transducer T6 corresponds to first scanning line 1. In the fixed channel routine, coordinates X1 and X2 are monitored to determine the scanning range of X1 to X2.

When the transmission/reception conditions are determined by the fixed channel routine, transmission and reception are started. Echo signals are converted by converter 26 to digital signals. These digital signals are input to zooming circuit section 20 and stored in memory 21. In this case, switch 23 is operated to couple memory 24 to memory 21. Echo signal data from memory 21 which corresponds to zooming frame ZF' is transferred to memory 24 and stored therein. Circuit 27 addresses memory 24 such that an area defined by X1, X2, Y1, and Y2 in memory 21 is stored as one-frame data in memory 24.

When echo signal data from memory 24 is input to enlargement coordinate circuit 25, enlargement coordinate conversion is performed. More specifically, echo signal data is read out from memory 24 in units of pixels to determine the coordinates of each pixel. In this case, a space corresponding to 1 to 3 pixels is present between each two readout adjacent pixels. In order to fill the space, the adjacent readout pixels are interpolated.

When echo signal data processed by circuit 25 is supplied to display 30 through converter 26, an enlarged image corresponding to frame ZF' is displayed on the screen of display 30, as shown in FIG. 3. The corresponding standard size tomographic image is displayed on the screen of display 31, and an enlarged image representing a portion thereof is displayed on display 30 at the same time. By observing these two images, the operator or doctor can accurately understand the position and state of the examined portion.

Figure 2:
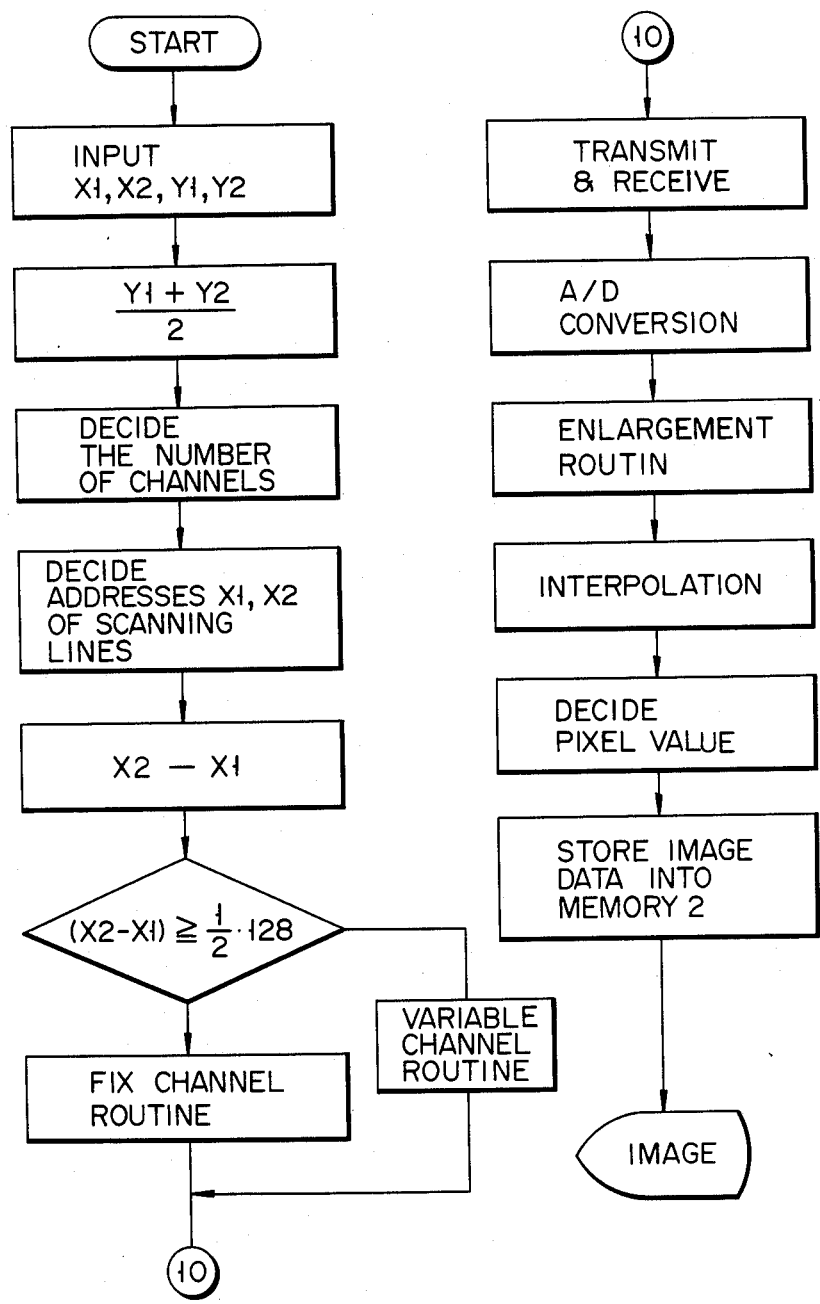
FIG. 2 is a flow chart for explaining the enlargement mode.
Figure 3:
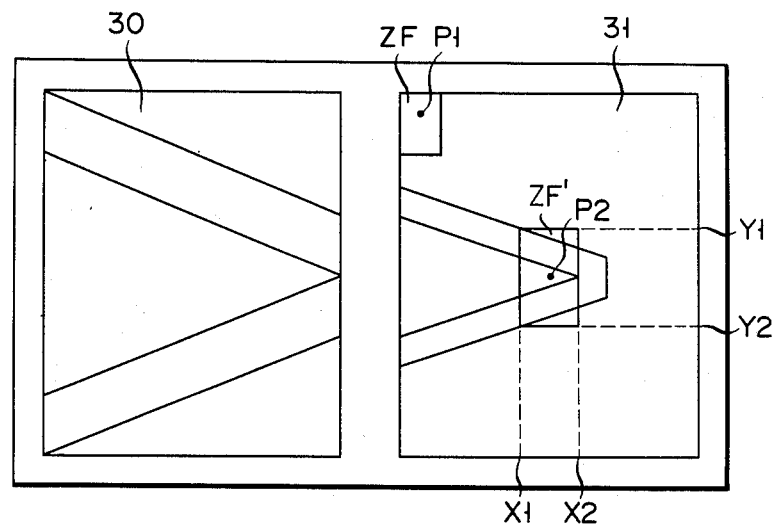
FIG. 3 is a plan view of a display section.

In the flow chart of FIG. 2, if (X2−X1)≧½×128 cannot be established, but (X2−X1)<½×128 is, the variable channel routine is executed. In this routine, scanning line doubling is performed, and odd- and even-numbers of transducers are alternately driven as disclosed in U.S. Pat. No. 4,332,171. For example, when an even number of transducers, e.g., 8 transducers T1 to T8, are driven to obtain one scanning line, the scanning line is located at a position on a line extended from the center of the array of transducers T1 to T8. Subsequently, an odd number of transducers, e.g., 7 transducers T2 to T8, are driven to obtain one scanning line. This scanning line is located on a line extended from transducer T5. Thereafter, another set of an even number of transducers, e.g., 8 transducers T2 to T9, are driven, and another set of an odd number of transducers, e.g., 7 transducers T3 to T9, are driven. In this case, the scanning line located on a line extended from the center of the array of transducers T2 to T9 and the scanning line located on a line extended from transducer T6 are respectively obtained. In this manner, the even and odd-numbered groups of transducers are alternately driven to double the scanning line, thereby improving the resolution of the tomographic image. This scanning can be achieved by causing controller 11 to alternately switch multiplexer 14 between the odd and even modes.

Another method of doubling the scanning lines is a fine angle sector scanning as disclosed in U.S. Pat. No. 4,075,598. For example, eight transducers are driven to obtain one scanning line. The same eight transducers are driven to obtain a scanning line deviated from the previous scanning line by a small angle. In other words, the same transducer group is driven twice to obtain two scanning lines slightly deviated from each other, thereby doubling the scanning lines. The same effect as in the previous scanning line doubling technique can be obtained.

In the variable channel mode, when the scanning line is located at coordinate X1 during transmission and reception, scanning by scanning line doubling is started. When the scanning line passes coordinate X2, scanning line doubling is stopped.

The echo signal data derived from scanning line doubling is stored in memory 24 through contact b of switch 23. Echo data read out from memory 24 is interpolated by circuit 25, and the interpolated data is input to display 31 through converter 26 and is displayed as an enlarged image on display 30.

Scanning line doubling can provide an enlarged image with a relatively high resolution. Therefore, diagnostic precision can be improved in ultrasonic diagnosis.

In the above embodiment, when the standard size image and the enlarged image are displayed on the individual displays, a one-frame image is stored in memory 21 for 1/30th of a second and at the same time, displayed on display 31 through converter 22. In the next 1/30 second, the echo data for the region to be enlarged is read out from memory 21 and is stored in memory 24. At the same time, the readout data is displayed as an enlarged image on display 30. Display 31 displays the echo data previously stored in memory 21 as the standard size image. In other words, display 31 displays the image of the echo data derived by the first 1/30 second scanning and displays the same echo data of memory 21 for the next 1/30 second. When echo data has been displayed twice, scanning is again started, and new echo data is displayed and stored. Therefore, echo data is stored and displayed for every 2/30 seconds.

In the above embodiment, two display units are used for displaying a standard size image and an enlarged image. However, these two imges may be displayed on a single display screen, one on the righthand half and the other on the lefthand half of the screen, as disclosed in U.S. Pat. No. 4,398,540. In this case, two image data are stored in a single frame memory, one in one half memory, section and the other in the other half memory section of the frame memory.

What is claimed is:

1. An ultrasonic imaging apparatus comprising:
   ultrasonic transducer means for emitting ultrasonic beams into an object to be examined, and for converting echoes reflected by the object to electric echo signals,
   image data output means coupled to said ultrasonic transducer means for converting the echo signals from said ultrasonic transducer means to image data;
   a first display screen section coupled to said image data output means for displaying standard size image data corresponding to a standard size image;
   means for designating a specific region of the standard size image displayed on said first display screen section;
   enlargement processing means coupled to said image data output means and said designating means for processing image data corresponding to the specific region specified by said designating means and for providing enlarged image data corresponding to the specific region; and
   a second display screen section coupled to said enlargement processing means for displaying the enlarged image data provided by said enlargement processing means corresponding to an enlarged image, said second display screen section being arranged adjacent to said first display screen section, wherein the standard size image and the enlarged image are observed together.

2. An apparatus according to claim 1, wherein said enlargement processing means comprises zooming means including first memory means for storing the standard size image data corresponding to the standard size image, second memory means for storing the image data corresponding to the specific region, addressing means for addressing said first and second memory means to read out the image data corresponding to the specific region from said first memory means and store the specific region image data as one-frame image data in said second memory means.

3. An apparatus according to claim 2, wherein said enlargement processing means includes means for interpolating the image data read out from said second memory means.

4. An apparatus according to claim 1, wherein said ultrasonic transducer means comprises a plurality of ultrasonic transducer elements, and driving means for supplying drive pulses to said transducer elements corresponding to at least the specific region, said driving means alternately driving even- and odd-numbered groups of said transducer elements to double a scanning line.

5. An apparatus according to claim 1, wherein said ultrasonic transducer means comprises a plurality of ultrasonic transducer elements, and driving means for supplying drive pulses to said transducer elements corresponding to at least the specific region, said driving means driving one group of said transducer elements twice to obtain two scanning lines slightly deviated from each other to double the scanning lines.

6. An apparatus according to claim 1, wherein said ultrasonic transducer means comprises a plurality of ultrasonic transducer elements, means for determining the number of transducer elements to be driven to obtain one scanning line in accordance with a position of the specific region, and means for supplying drive pulses to said transducer elements determined by said determining means.

7. An ultrasonic imaging apparatus comprising:
   ultrasonic transducer means for emitting ultrasonic beams into an object to be examined, and for converting echoes reflected by the object to electric echo signals;
   image data output means coupled to said ultrasonic transducer means for converting the echo signals from said ultrasonic transducer means to image data;
   zooming means coupled to said image data output means for processing said image data corresponding to a specific region to provide enlarged image data for a zoomed-up image;
   display means coupled to said zooming means, for displaying the image data as a standard size image and the enlarged image data as a zoomed-up image corresponding to the specific region of the standard size image, said display means including a first display screen for displaying the standard size image and a second display screen for displaying the zoomed-up image, said first and second display screens being arranged adjacent to each other, wherein the standard size image and zoomed-up image are observed together; and means for designating the specific region of the standard size image displayed on said first display screen.

8. An apparatus according to claim 7, wherein said zooming means comprises first memory means coupled to said image data output means for storing the image data output from said image data output means, second memory means coupled to said first memory means for storing image data corresponding to the specific region, and addressing means for addressing said first and second memory means to read out the image data corresponding to the specific region from said first memory means and store the specific region image data in said second memory means as one-frame image data, the stored image data in said first and second memory means being respectively displayed on the first and second display screens.

9. An apparatus according to claim 8, wherein said zooming means includes means for interpolating the specific region image data stored in said second memory means.

10. An apparatus according to claim 7, wherein said ultrasonic transducer means includes an ultrasonic transducer constructed by an array of ultrasonic transducer elements, and driving means for driving the ultrasonic transducer elements to generate an ultrasonic scanning line from said ultrasonic transducer, by which the echoes are converted to the electric echo signals, said driving means alternately driving odd- and even-numbered groups of the ultrasonic transducer elements to double the scanning line when the specific region is less than a predermined size.

11. An apparatus according to claim 7, wherein said display means comprises two display units rspectively having the first and second display screens.

* * * * *